United States Patent
Nakatate et al.

(10) Patent No.: US 7,813,607 B2
(45) Date of Patent: Oct. 12, 2010

(54) OPTICAL FIBER BUNDLE UNIT FOR TRANSMITTING ULTRAVIOLET LIGHT

(75) Inventors: Ken-ichi Nakatate, Sakura (JP); Tomoaki Toriya, Sakura (JP); Manabu Kudoh, Sakura (JP); Katsuyuki Seto, Sakura (JP); Takashi Tsumanuma, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/084,515

(22) Filed: Mar. 17, 2005

(65) Prior Publication Data
US 2005/0238302 A1    Oct. 27, 2005

Related U.S. Application Data

(63) Continuation of application No. 10/119,916, filed on Apr. 9, 2002, now Pat. No. 6,892,012.

(30) Foreign Application Priority Data
May 18, 2001    (JP) ............................... 2001-149953

(51) Int. Cl.
*G02B 6/04* (2006.01)
(52) U.S. Cl. ...................... 385/115; 385/105
(58) Field of Classification Search ................. 385/115, 385/137, 141, 92, 100, 102, 105, 142
See application file for complete search history.

(56) References Cited

U.S. PATENT DOCUMENTS

| | | | |
|---|---|---|---|
| 3,279,902 A * | 10/1966 | Gardner | 65/393 |
| 4,792,347 A * | 12/1988 | Deneka et al. | 65/432 |
| 5,059,229 A * | 10/1991 | Blankenship et al. | 65/424 |
| 5,061,035 A * | 10/1991 | Rogers, Jr. | 385/115 |
| 5,203,896 A | 4/1993 | Neuberger | |
| 5,267,343 A * | 11/1993 | Lyons et al. | 385/141 |
| 5,554,156 A * | 9/1996 | Shimizu | 606/17 |
| 5,657,404 A | 8/1997 | Buchanan et al. | |
| 5,901,264 A | 5/1999 | Cablibel et al. | |

(Continued)

FOREIGN PATENT DOCUMENTS

EP    0879799 A2    7/2010

(Continued)

OTHER PUBLICATIONS

European Search Report issued on the counterpart European application No. 020080000.8.

*Primary Examiner*—Peter Macchiarolo
(74) *Attorney, Agent, or Firm*—K&L Gates LLP

(57) ABSTRACT

An optical fiber bundle unit is provided for transmitting ultraviolet light in which the increase of the transmission loss caused by radicals generated in the optical fiber by irradiation or transmission of ultraviolet light is suppressed and a stable energy state is maintained even after the irradiation or transmission of ultraviolet light. The optical fiber bundle unit for transmitting ultraviolet light includes an optical fiber bundle and a sealed container in which the optical fiber bundle is held. A diffusion of hydrogen gas is suppressed by putting the optical fiber bundle pretreated in a hydrogen atmosphere into the sealed container, followed by filling the sealed container with a mixed gas including a hydrogen gas and a gas which is not combustible, will not support combustion, and will not explode.

8 Claims, 1 Drawing Sheet

U.S. PATENT DOCUMENTS

| | | |
|---|---|---|
| 6,188,814 B1 | 2/2001 | Bhalla |
| 6,220,059 B1 | 4/2001 | Klein et al. |
| 6,496,627 B1 * | 12/2002 | Tuminaro .................. 385/102 |
| 6,587,625 B1 * | 7/2003 | Abate et al. ................. 385/124 |
| 6,709,997 B2 | 3/2004 | Urano et al. |
| 7,277,616 B2 * | 10/2007 | Ishikawa et al. ............ 385/102 |

FOREIGN PATENT DOCUMENTS

| | | |
|---|---|---|
| FR | 2641616 A1 | 7/1990 |
| JP | 61-210302 | 9/1986 |
| JP | 62-014602 | 1/1987 |
| JP | 62-014604 | 1/1987 |
| JP | 62-089611 | 6/1987 |
| JP | 63-129034 | 6/1988 |
| JP | 06-034830 | 2/1994 |
| JP | 08-094871 | 4/1996 |
| JP | 09-171118 | 6/1997 |
| JP | 11-343144 | 12/1999 |
| JP | 2000-086273 | 3/2000 |
| JP | 2000-103629 | 4/2000 |
| JP | 2000-203856 | 7/2000 |
| JP | 2000-321445 | 11/2000 |

* cited by examiner

OPTICAL FIBER BUNDLE UNIT FOR TRANSMITTING ULTRAVIOLET LIGHT

CROSS REFERENCE TO RELATED APPLICATIONS

The present application is a continuation of U.S. patent application Ser. No. 10/119,916 filed on Apr. 9, 2002, now U.S. Pat. No. 6,892,012 the disclosure of which is herein incorporated by reference.

BACKGROUND OF THE INVENTION

1. Field of the Invention

The present invention relates to an optical fiber bundle unit for transmitting ultraviolet light such as that from an excimer laser or the like.

2. Description of Related Art

When an optical fiber having a core doped with germanium dioxide is used for transmitting ultraviolet light, loss increase and the transmittance decrease occur due to Rayleigh scattering, and therefore, the optical fiber cannot be used for transmitting ultraviolet light. Therefore, a pure quartz glass core optical fiber having a pure quartz glass core portion and a cladding portion doped with fluorine is usually used as an optical fiber for transmitting ultraviolet light.

However, when the pure quartz glass core optical fiber is used for irradiating and transmitting ultraviolet light having a high energy level, such as a KrF excimer laser or an ArF excimer laser, the quartz glass included in the optical fiber is affected by optical energy (hv) to generate radicals (defects of the molecular structure in the optical fiber) in accordance with the following formula (1):

$$\text{Si—O—Si} + h\nu \rightarrow \text{Si.} + \text{.O—Si} \qquad (1)$$

As a result, the transmittance of the optical fiber decreases.

In order to prevent the decrease of the transmittance, the optical fiber is exposed to an atmosphere including hydrogen so that hydrogen enters the optical fiber, as a result of which radicals generated by irradiating ultraviolet light having a high energy level react with hydrogen to yield Si—OH and Si—H species, which results in the energy state of the optical fiber being stable by repairing defects of the molecular structure in the optical fiber (which are caused by radicals).

Even when the optical fiber is exposed in the hydrogen atmosphere, radicals may not be completely eliminated from the optical fiber. Alternatively, when ultraviolet light having a high irradiation energy is irradiated on the optical fiber subjected to the hydrogen exposure, bonds in the net-like molecular structure of the quartz glass may be cut, generating radicals. At this time, when hydrogen is present in the optical fiber after the hydrogen exposure, the generated radicals immediately react with hydrogen in a stable energy state, as a result of which the increase of the transmission loss can be suppressed.

However, since hydrogen tends to gradually diffuse in the aforementioned conventional optical fiber over time, which reduces the concentration of hydrogen remaining in the optical fiber, it becomes impossible to continue to suppress the increase of the transmission loss over time.

SUMMARY OF THE INVENTION

The present invention is accomplished in view of the aforementioned circumstances.

An object of the present invention is to provide an optical fiber bundle unit for transmitting ultraviolet light in which the increase of the transmission loss caused by radicals generated in the optical fiber by irradiation or transmission of ultraviolet light is suppressed and in which a stable energy state is maintained even after the irradiation or transmission of ultraviolet light.

The present invention provides an optical fiber bundle unit for transmitting ultraviolet light including: an optical fiber bundle; and a sealed container in which the optical fiber bundle is held, wherein the sealed container contains a hydrogen gas.

The optical fiber bundle may be pretreated in a hydrogen atmosphere in which the pressure is set to 1 to 500 kgf/cm² and the temperature is set to 80 to 300° C. The sealed container may be flexible. Sealing members produced from a light-transmitting material may be formed at both ends of the sealed container. The length of the sealed container may be adjustable in the longitudinal direction.

The sealed container may contain a mixed gas including the hydrogen gas and a gas which is not combustible, will not support combustion, and will not explode.

The pressure of the hydrogen gas contained in the sealed container may be set to a pressure of 1 atmosphere or less.

The molecular size of the gas which is not combustible, will not support combustion, and will not explode may be larger than the size of an aperture portion formed in a net-like molecular structure of a quartz glass included in the optical fiber bundle.

The diffusion of the hydrogen gas may be suppressed by putting the optical fiber bundle pretreated in a hydrogen atmosphere into the sealed container, followed by filling the sealed container with the mixed gas.

DETAILED DESCRIPTION OF THE INVENTION

In the following, the present invention will be explained in detail.

Figure 1:
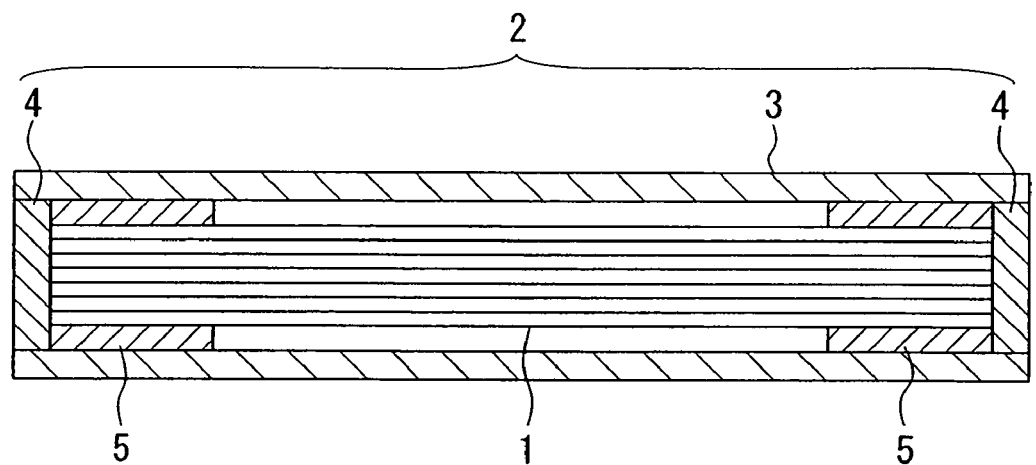
FIG. 1 is a cross-sectional view showing an optical fiber bundle unit for transmitting ultraviolet light according to one embodiment of the present invention.

FIG. 1 is a cross-sectional view showing an optical fiber bundle unit for transmitting ultraviolet light according to one embodiment of the present invention. The optical fiber bundle unit for transmitting ultraviolet light includes an optical fiber bundle 1, a sealed container 2 holding the optical fiber bundle 1, and stopper members 5 and 5 fastening the optical fiber bundle 1 to both ends of the sealed container 2.

The optical fiber bundle 1 includes a plurality of pure quartz glass core optical fibers each having a pure quartz glass core portion and a cladding portion doped with fluorine, which are bundled together. In the optical fiber bundle unit for transmitting ultraviolet light, the optical fiber bundle 1 is fastened to the both ends of the sealed container 2 by the stopper members 5 and 5 and is held in the sealed container 2. The stopper member 5 is preferably produced from metal such as stainless steel, brass, aluminum, or the like, or ceramic such as alumina ceramic, quartz, or the like.

The optical fiber bundle 1 is preferably pretreated in the hydrogen atmosphere in which the pressure is set to 1 to 500 kgf/cm², more preferably 10 to 100 kgf/cm², and the temperature is set to 80 to 300° C., more preferably 100 to 150° C. When the optical fiber bundle 1 is exposed to hydrogen under the conditions in which the pressure is set to 1 to 500 kgf/cm$^2$ and the temperature is set to 80 to 300° C., hydrogen efficiently enters and diffuses into the optical fibers of the optical fiber bundle 1. Then, the optical fiber bundle 1 is put in the sealed container 2 and hydrogen gas is filled in the sealed container 2. Thereby, even when radicals are generated in the optical fiber bundle 1, hydrogen can immediately react with the radicals, as a result of which the energy state of the optical fiber bundle 1 can be maintained to be stable.

The sealed container 2 includes a cylindrical member 3 and tabular sealing members 4 and 4 which seal both ends of the cylindrical member 3. In the sealed container 2, the optical fiber bundle 1 is held and hydrogen gas is filled up to a predetermined pressure, preferably 1 to 500 kgf/cm$^2$, and more preferably 10 to 100 kgf/cm$^2$.

The cylindrical member 3 is produced from a material through which hydrogen cannot permeate or barely permeates, such as a metal such as stainless steel or the like.

Preferably, the cylindrical member 3 is flexible. In order that the cylindrical member 3 has flexibility, the cylindrical member 3 is preferably produced from a metal pipe, a metal corrugated pipe, or the like, such as a accordion pleated copper, an accordion pleated stainless steel, or the like, which is flexibly worked so as to have a structure in which the cross-sectional shape in the longitudinal direction is in a wavy shape and the external shape is a frilled shape. When the cylindrical member 3 has flexibility, the optical fiber bundle unit for transmitting ultraviolet light can be laid at various locations and can be broadly applied for various purposes.

The thickness of the cylindrical member 3 is determined in compliance with the material thereof. For example, when the cylindrical member 3 is produced from stainless steel, the thickness of the cylindrical member 3 is preferably 50 to 1,000 μm, and more preferably 100 to 500 μm.

The length of the cylindrical member 3 can preferably be adjustable in the longitudinal direction. In order that the length of the cylindrical member 3 is adjustable, the cylindrical member 3 is preferably flexibly worked so as to have a structure in which the cross-sectional shape in the longitudinal direction is a wavy shape and the external shape is a frilled shape. Alternatively, in order that the length of the cylindrical member 3 is adjustable, an adjusting member for adjusting the length of the cylindrical member 3 to the length of the optical fiber bundle 1 may be disposed at the cylindrical member 3. This adjusting member comprises, for example, a tube member and a sleeve which is inserted into the tube member so as to slidably move along the longitudinal direction of the tube member. The adjusting member is disposed at the cylindrical member 3 so as to possess the same axis with the cylindrical member 3 and to connect the tube member or sleeve with the end of the cylindrical member 3, and the length of the cylindrical member 3 can be adjusted by moving the sleeve. The tube member and the sleeve are airtightly joined by an airtight joint or a seal using a technique such as adhesion, welding, or caulking after moving the sleeve, for example. Furthermore, the adjusting member can also be disposed at the midway of the cylindrical member 3.

When the length of the cylindrical member 3 is adjustable in the longitudinal direction, the length of the cylindrical member 3 can be adjusted in accordance with the length of the optical fiber bundle 1 held in the cylindrical member 3, as a result of which both ends of the optical fiber bundle 1 can be adapted to inner surfaces of sealing members 4 and 4 disposed at both ends of the cylindrical member 3. Thereby, the loss increase of light which is incident on one end of the optical fiber bundle 1 through one of the sealing members 4 and 4 and which is emitted from the other end of the optical fiber bundle 1 through the other of the sealing members 4 and 4 can be suppressed.

The sealing member 4 is produced from a light-transmitting material, preferably from a material which can transmit a high proportion of ultraviolet light, such as magnesium fluoride, quartz glass, or the like, in order that light can efficiently enter the optical fiber bundle 1 held in the sealed container 2. Specifically, when the sealing member 4 is produced from quartz glass, the sealing member 4 is preferably exposed to hydrogen in the same manner as the optical fiber bundle 1 described above so as to eliminate radicals generated in the sealing member 4. Thus, by producing the sealing member 4 from a material which can transmit a high proportion of ultraviolet light, such as magnesium fluoride, quartz glass, or the like, the loss increase of light passing through the sealing member 4 can be suppressed. In addition, it is further preferable that an AR (anti reflect) coating is performed on the sealing member 4.

The sealing member 4 has a strength which can resist the pressure of the gas filled up in the sealed container 2. For example, the thickness of the sealing member 4 is determined in compliance with factors such as an effective diameter of the sealing member 4 and a safety factor required to the effective diameter which is estimated at 3-10 times and more, for example.

In order to improve the air tightness between the sealing members 4 and 4 and the cylindrical member 3, seals are formed between the sealing members 4 and 4 and the cylindrical member 3 by using a sealant such as an O-ring, various adhesives, an indium wire, or the like, or by brazing.

Moreover, a suitable sealing material such as glasses such as low temperature melt glass, resins, metals, or the like may be filled between the optical fibers of the optical fiber bundle 1 or between the optical fiber bundle 1 and the sealed container 2, so as to improve the air tightness therebetween. In addition, the air tightness can also be improved by performing fusion welding of a plurality of pure quartz glass core optical fibers of the optical fiber bundle 1. Thereby, the inside of the sealed container 2 has an improved sealed structure. When the sealed container 2 can hold gas filled in the sealed container 2, the sealing members 4 and 4 may not be disposed in the sealed container 2 and both ends of the optical fiber bundle 1 may be bare. When the both ends of the optical fiber bundle 1 can be bare, the loss of ultraviolet light incident on optical fiber bundle 1 can be suppressed because ultraviolet light is not blocked off by the sealing member 4.

Preferably, the concentration and the pressure of the hydrogen gas filled in the sealed container 2 together with the optical fiber bundle 1 is set to be high, in order to improve optical properties and durability by sufficiently eliminating radicals generated in the optical fiber bundle 1. However, the hydrogen gas is preferably one component of a mixed gas including the hydrogen gas and a gas which is not combustible, will not support combustion, and will not explode, in order to ensure safety when the sealed container 2 is broken. By mixing the gas which is not combustible, will not support combustion, and will not explode with the hydrogen gas, an explosion can be prevented even when the gas filled in the sealed container 2 leaks from the sealed container 2.

Specific examples of the gas which is not combustible, will not support combustion, and will not explode include rare gases such as helium (He) gas, neon (Ne) gas, and argon (Ar) gas, nitrogen ($N_2$) gas, carbon dioxide ($CO_2$) gas, mixed gases thereof, and the like.

Moreover, when the total pressure of the mixed gas filled up in the sealed container 2 is increased while maintaining the concentration of the hydrogen gas contained in the mixed gas, the pressure of the hydrogen gas can also be increased.

The concentration of the hydrogen gas is suitably determined so as to improve optical properties and durability and not to cause explosions. The concentration of the hydrogen gas is preferably 4% and below by volume, and more preferably 1 to 3.5% by volume, relative to the total volume of the mixed gas. When the concentration of the hydrogen gas is over 4% by volume (in the atmosphere), the risk of generating an explosion may tend to increase when the gas leaks from the sealed container 2.

Furthermore, the pressure of the hydrogen gas is also determined preferably 1 to 500 kgf/cm$^2$, and more preferably 10 to 100 kgf/cm$^2$, for example, so as to improve optical properties and durability. Alternatively, when the mixed gas is not used and only the hydrogen gas is filled in the sealed container 2, the pressure of the hydrogen gas is preferably 1 times atmospheric pressure or less, more preferably 0.01 to 1 atmospheric pressure for considering the safety. By setting the pressure of the hydrogen gas to be 1 times atmospheric pressure or less, even when the sealed container 2 is broken and the air tightness of the sealed container 2 is then lost, the gas filled in the sealed container 2 is pushed back by the atmospheric pressure, as a result of which safety can be maintained.

Meanwhile, the molecular size of the gas which is not combustible, will not support combustion, and will not explode is preferably larger than the size of an aperture portion formed in a net-like molecular structure of the quartz glass included in the optical fiber bundle 1. The molecular size of the gas which is not combustible, will not support combustion, and will not explode is preferably 1.5 angstrom and more, more preferably 2 to 10 angstrom. Thus, by setting the molecular size of the gas to be larger than the size of the aperture portion, the gas except for the hydrogen gas can scarcely penetrate into the optical fiber bundle 1, as a result of which the decrease of the concentration of the hydrogen gas in the optical fiber bundle 1 can be prevented.

Moreover, the gas contained in the mixed gas in addition to the hydrogen gas can prevent the hydrogen gas from diffusing from the optical fiber bundle 1. As a result, the concentration of the hydrogen gas kept in the optical fiber bundle 1 can be increased without increasing the concentration of the hydrogen gas in the sealed container 2. Although the pressure of the mixed gas can be suitably determined in accordance with the size of the sealed container 2 or the like, the pressure of the mixed gas is preferably within a range from 1 to 500 kgf/cm$^2$, and more preferably 10 to 100 kgf/cm$^2$, for example.

In contrast, when the pressure of the mixed gas in the sealed container 2 cannot be raised due to the structure of the sealed container 2, the concentration of the hydrogen gas in the optical fiber bundle 1 can be maintained to a predetermined level by mixing the hydrogen gas with appropriate rare gas of which the molecular size is sufficiently smaller than that of the aperture portion in the net-like molecular structure of the quartz glass of the optical fibers and which does not substantially influence optical characteristics of the optical fibers of the optical fiber bundle 1.

The optical fiber bundle 1 pretreated by the hydrogen gas is inserted into the sealed container 2, followed by filling the sealed container 2 with air or the gas in addition to the hydrogen gas at 0.5 to 100 atmospheric pressure, more preferably at 10 to 100 atmospheric pressure, as a result of which the diffusion of the hydrogen gas can be prevented.

In order to fill the gas into the sealed container 2, the sealed container 2 is sealed in the gas atmosphere by means of the sealing members 4 and 4. Alternatively, the gas may be filled into the sealed container 2 through a valve provided with a check valve, which is disposed at least one of the sealing members 4 and 4. By using the valve provided with the check valve, it is possible to prevent the leakage of the mixed gas during filling of the gas into the sealed container 2.

Figure 2:
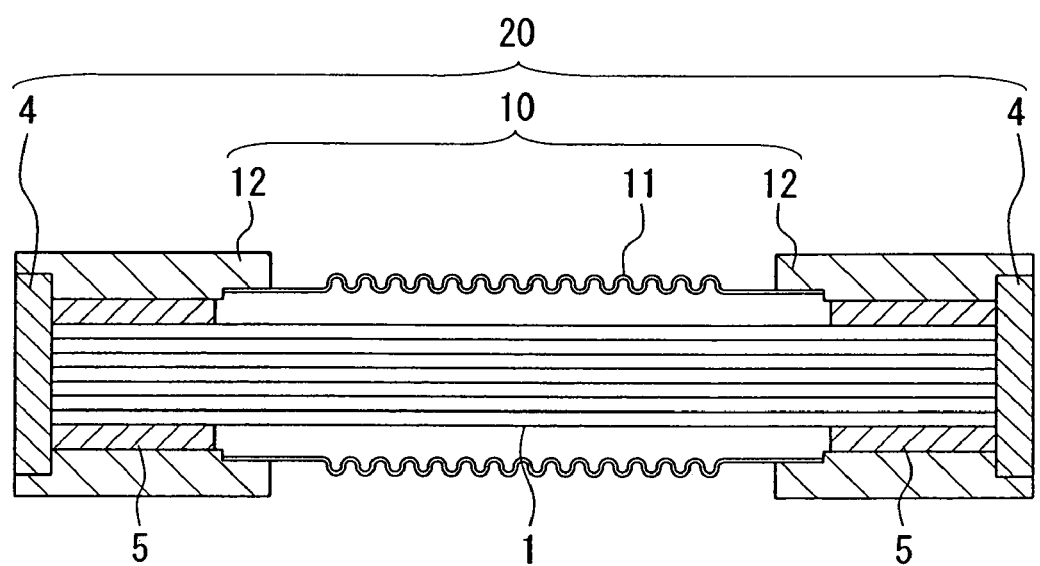
FIG. 2 is a cross-sectional view showing an optical fiber bundle unit for transmitting ultraviolet light according to another embodiment of the present invention.

FIG. 2 is a cross-sectional view showing another embodiment of the optical fiber bundle unit for transmitting ultraviolet light according to the present invention. This optical fiber bundle unit for transmitting ultraviolet light is different from the optical fiber bundle unit for transmitting ultraviolet light shown in FIG. 1 in that a cylindrical member 10 included in a sealed container 20 includes a flexible member 11 and fixing members 12 and 12. The flexible member 11 has flexibility and is produced from a metal pipe such as a stainless steel pipe flexibly worked to have an accordion pleated structure in which the cross-sectional shape in the longitudinal direction is a wavy shape and the external shape is a frilled shape.

The aforementioned optical fiber bundle unit can be applied for transmitting the light under the radial rays such as γ-rays in addition to ultraviolet light without increasing the transmission loss of the optical fiber bundle. Moreover, even when the optical fiber bundle unit is used for transmitting intense ultraviolet light such those from as an excimer laser, the optical transmittance and the durability of the optical fiber bundle scarcely decrease.

As described above, since the optical fiber bundle unit for transmitting ultraviolet light includes the optical fiber bundle and the sealed container holding the optical fiber bundle and the hydrogen gas, radicals generated by irradiating or transmitting ultraviolet light into the optical fiber bundle can be eliminated by reaction between hydrogen and radicals, as a result of which the energy state of the optical fiber bundle can be maintained so as to be stable, and the increase of the transmission loss can be suppressed.

When the optical fiber bundle is pretreated in the hydrogen atmosphere in which the pressure is set to 1 to 500 kgf/cm$^2$ and the temperature is set to 80 to 300° C., even when radicals are generated in the optical fibers of the optical fiber bundle, the radicals are more effectively eliminated by immediately reacting with the hydrogen gas and the energy state is recovered so as to be stable.

When the sealed container has flexibility, the optical fiber bundle unit can be layed on various places.

When the sealing members produced from the light-transmittable material are formed at the both ends of the sealed container, the loss increase of light incident on the optical fiber bundle can be emitted therefrom.

When the sealed container is flexible in the longitudinal direction, the length of the sealed container can be adjusted in accordance with the length of the optical fiber bundle held in the sealed container, as a result of which both ends of the optical fiber bundle can appropriately be adapted to the inner surfaces of the sealing members at both ends of the sealed container.

When the hydrogen gas is one component of the mixed gas filled into the sealed container and including the gas which is not combustible, will not support combustion, and will not explode, the safety of the optical fiber bundle unit can be increased even when the gas leaks out from the sealed container.

Furthermore, by setting the pressure of the hydrogen gas contained in the sealed container to 1 times atmospheric pressure or less, the hydrogen gas is pushed back into the sealed container by atmospheric pressure even when the air tightness of the sealed container is lost by breaking the sealed container. As a result, the safety of the optical fiber bundle unit can be increased.

When the molecular size of the gas which is not combustible, will not support combustion, and will not explode is larger than the size of the aperture portion formed in a net-like molecular structure of the quartz glass, the gas except for the hydrogen gas cannot significantly penetrate into the optical fiber bundle and the hydrogen gas can mostly penetrate into the optical fiber bundle, as a result of which the optical fiber bundle is scarcely influenced by the gas except for the hydrogen gas.

What is claimed is:

1. An optical fiber bundle unit for transmitting ultraviolet light including:
    an optical fiber bundle; and
    a sealed container in which the optical fiber bundle is held,
    wherein a diffusion of hydrogen gas is suppressed by putting the optical fiber bundle, exposed to a hydrogen atmosphere in which the pressure is set to 10 to 500 kgf/cm$^2$ and the temperature is set to 80 to 300° C., into the sealed container, followed by filling the sealed container with a mixed gas including a hydrogen gas and a gas which is not combustible, will not support combustion, and will not explode,
    the sealed container includes a cylindrical member and sealing members which seal both ends of the cylindrical member, and seals are formed between the cylindrical member and sealing members using a sealant,
    the concentration of the hydrogen gas relative to the total volume of the mixed gas is 4% and below by volume, and
    the pressure of the mixed gas is within a range from 10 to 500 kgf/cm$^2$.

2. An optical fiber bundle unit for transmitting ultraviolet light according to claim 1, wherein the gas which is not combustible, will not support combustion, and will not explode is carbon dioxide gas.

3. An optical fiber bundle unit for transmitting ultraviolet light according to claim 1, wherein a molecular size of the gas which is not combustible, will not support combustion, and will not explode is larger than a size of an aperture portion formed in a net-like molecular structure of a quartz glass included in the optical fiber bundle.

4. An optical fiber bundle unit for transmitting ultraviolet light according to claim 1, wherein the cylindrical member is produced from a material through which hydrogen cannot permeate.

5. An optical fiber bundle unit for transmitting ultraviolet light according to claim 1, wherein said optical fiber bundle includes a plurality of optical fibers each having a pure quartz glass core portion and a cladding portion doped with fluorine.

6. An optical fiber bundle unit for transmitting ultraviolet light comprising:
    an optical fiber bundle; and
    a sealed container in which the optical fiber bundle is held,
    wherein a diffusion of hydrogen gas is suppressed by putting the optical fiber bundle, exposed to a hydrogen atmosphere in which the pressure is set to 10 to 500 kgf/cm$^2$ and the temperature is set to 80 to 300° C., into the sealed container, followed by filling the sealed container with the mixed gas including a hydrogen gas and a gas which is not combustible, will not support combustion, and will not explode,
    a sealing material is filled between optical fibers of the optical fiber bundle,
    both ends of the optical fiber bundle are bared on end faces of the optical fiber bundle unit,
    the concentration of the hydrogen gas relative to the total volume of the mixed gas is 4% and below by volume, and
    the pressure of the mixed gas is within a range from 10 to 500 kgf/cm$^2$.

7. An optical fiber bundle unit for transmitting ultraviolet light according to claim 6, wherein a molecular size of the gas which is not combustible, will not support combustion, and will not explode is larger than a size of an aperture portion formed in a net-like molecular structure of a quartz glass included in the optical fiber bundle.

8. An optical fiber bundle unit for transmitting ultraviolet light according to claim 6, wherein said optical fiber bundle includes a plurality of optical fibers each having a pure quartz glass core portion and a cladding portion doped with fluorine.

* * * * *